(12) United States Patent
Inoue et al.

(10) Patent No.: US 9,867,060 B2
(45) Date of Patent: Jan. 9, 2018

(54) RADIO COMMUNICATION SYSTEM AND ANTENNA CONFIGURATION DETERMINATION METHOD

(71) Applicant: NTT DOCOMO, INC., Tokyo (JP)

(72) Inventors: Yuki Inoue, Tokyo (JP); Daiki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/907,927

(22) PCT Filed: Jul. 7, 2014

(86) PCT No.: PCT/JP2014/068063
§ 371 (c)(1),
(2) Date: Jan. 27, 2016

(87) PCT Pub. No.: WO2015/019775
PCT Pub. Date: Feb. 12, 2015

(65) Prior Publication Data
US 2016/0165457 A1   Jun. 9, 2016

(30) Foreign Application Priority Data

Aug. 6, 2013   (JP) .................................. 2013-163654

(51) Int. Cl.
*H04M 1/00* (2006.01)
*H04W 16/28* (2009.01)
(Continued)

(52) U.S. Cl.
CPC ............ *H04W 16/28* (2013.01); *H01Q 1/246* (2013.01); *H01Q 3/00* (2013.01); *H04B 7/0417* (2013.01);
(Continued)

(58) Field of Classification Search
None
See application file for complete search history.

(56) References Cited

U.S. PATENT DOCUMENTS

2014/0098689 A1* 4/2014 Lee ...................... H04B 7/0469
370/252
2014/0192762 A1* 7/2014 Li ...................... H04L 25/03929
370/329
(Continued)

FOREIGN PATENT DOCUMENTS

WO   2013/024350 A2   2/2013
WO   2013/024852 A1   2/2013

OTHER PUBLICATIONS

Extended European Search Report in counterpart European Application No. 14 833 785.0 dated Jun. 21, 2016 (7 pages).
(Continued)

*Primary Examiner* — Suhail Khan
(74) *Attorney, Agent, or Firm* — Osha Liang LLP

(57) ABSTRACT

In a radio communication system performing radio communications using multiple antenna ports, a radio base station apparatus transmits a reference signal from each of the antenna ports in multiple patterns corresponding to a plurality of antenna port configurations formed of single antenna elements or groups of antenna elements, and determines the antenna elements that form the respective antenna ports based upon feedback information supplied from a mobile device that has received the reference signal in the multiple patterns.

8 Claims, 9 Drawing Sheets

(A) ANTENNA PORT CONFIGURATION #a (B) ANTENNA PORT CONFIGURATION #b (C) ANTENNA PORT CONFIGURATION #c

(51) Int. Cl.
  *H01Q 3/00* (2006.01)
  *H01Q 1/24* (2006.01)
  *H04B 7/0417* (2017.01)
  *H04B 7/06* (2006.01)

(52) U.S. Cl.
  CPC ......... *H04B 7/0626* (2013.01); *H04B 7/0691* (2013.01); *H04B 7/0695* (2013.01)

(56) References Cited

U.S. PATENT DOCUMENTS

2014/0211731 A1    7/2014  Inoue et al.
2016/0065290 A1*   3/2016  Zhu ................... H04W 52/0209
                                                    370/329

OTHER PUBLICATIONS

International Search Report issued in corresponding application No. PCT/JP2014/068063 dated Sep. 22, 2014 (3 pages).
Written Opinion issued in corresponding application No. PCT/JP2014/068063 dated Sep. 22, 2014 (4 pages).
Alcatel-Lucent Shanghai Bell, Alcatel-Lucent; "Considerations on CSI feedback enhancements for high-priority antenna configurations"; 3GPP TSG-RAN WG1 #66, R1-112420, Athens, Greece, Aug. 22-26, 2011 (7 pages).
Office Action issued in corresponding Japanese Application No. 2013-163654, dated May 9, 2017 (6 pages).

* cited by examiner

US 9,867,060 B2

RADIO COMMUNICATION SYSTEM AND ANTENNA CONFIGURATION DETERMINATION METHOD

TECHNICAL FIELD

The present invention relates to a radio communication system implementing radio communications using multiple antenna ports and an antenna configuration determination method.

BACKGROUND ART

Along with widespread adoption of smartphones in recent years, insufficiency in base station capacity has become one of the problems. As a countermeasure for solving insufficient base station capacity, a small-cell base station architecture using a number of small-size base station apparatuses is being discussed. Such architecture is expected to become popular in the coming years.

To enhance the base station capacity, active antenna systems (AASs) using vertically arranged antenna elements are also discussed. Elevation beamforming allows vertical sectorization (dividing a cell into a closer sector and a more distant sector from the base station) to improve the capacity.

Three-dimensional multiple input multiple output (3D-MIMO) systems using horizontally and vertically arranged antenna elements are being put into practical use. In MIMO systems, correlation between antenna branches depends on the radio environment to some extent. In other words, the correlation may vary depending on the environment even though the antenna configuration is the same. For example, in urban areas with more reflected waves, the angle spread of radio waves (or distribution of angle of arrival) is greater and the correlation between antenna branches becomes smaller. In order to produce high-quality areas, it is desired to determine the optimum antenna configuration reflecting the radio environment and set up an antenna that meets with the optimum configuration.

SUMMARY OF THE INVENTION

Technical Problem to be Solved

It is an objective of the invention to provide a radio communication system that can achieve an antenna port configuration appropriate to the radio environment without increasing operations in the circumstances where an AAS antenna or a 3D-MIMO antenna is set up and smaller-cell base stations are arranged.

Means for Solving the Problem

To achieve the objective, in one aspect of the invention, a radio communication system includes a radio base station apparatus, wherein the radio base station apparatus has a plurality of antenna port configurations formed of single antenna elements or groups of antenna elements, and wherein the radio base station apparatus is configured to transmit a reference signal from each antenna port in patterns corresponding to said plurality of antenna port configurations.

Advantageous Effect of the Invention

An antenna port configuration appropriate to the radio environment is achieved without increasing operations even under the circumstances where many smaller-cell base stations are arranged.

EMBODIMENTS TO CARRY OUT THE INVENTION

Figure 1:
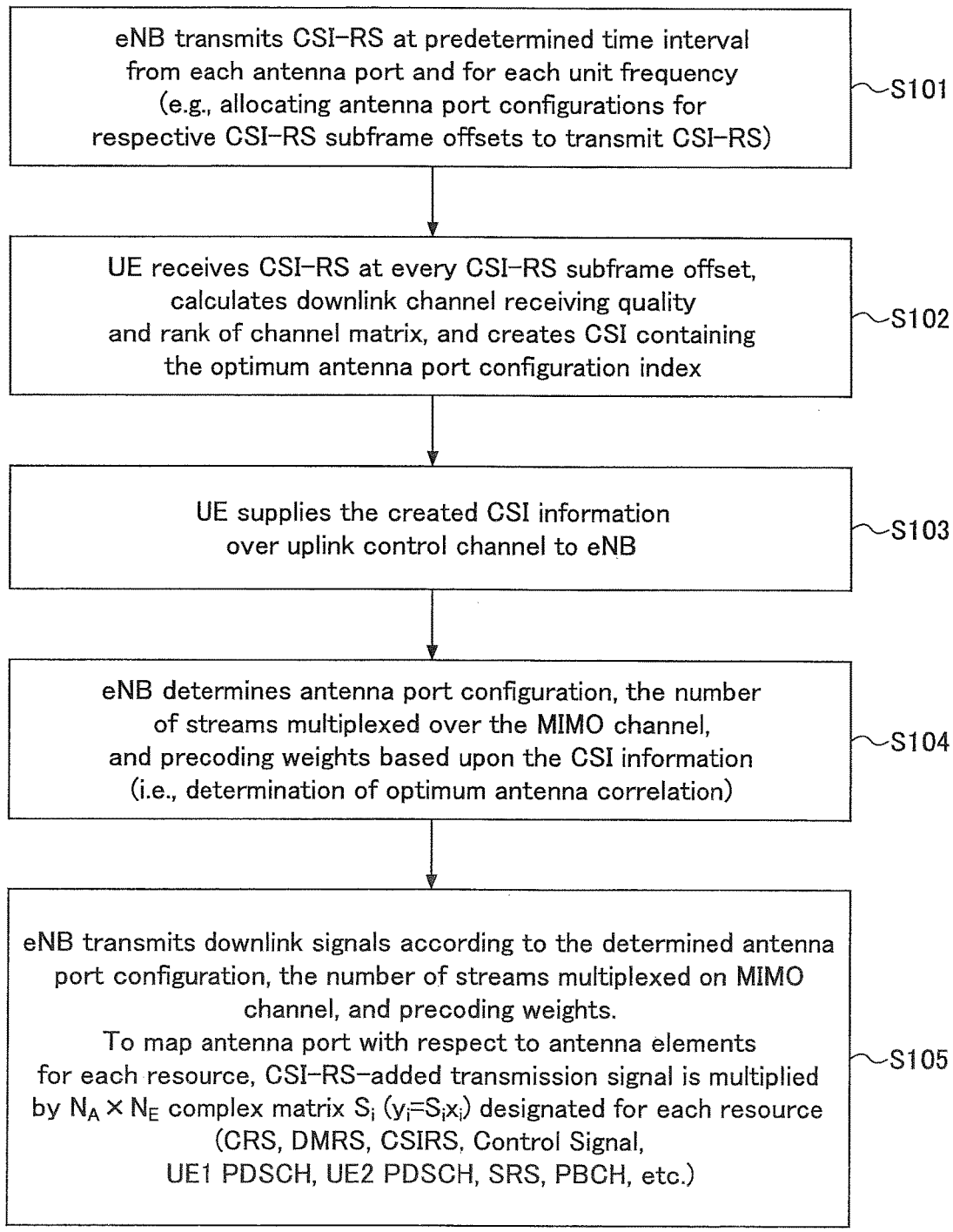
FIG. 1 is a flowchart illustrating an antenna configuration determination scheme according to the embodiment.

FIG. 1 is a flowchart of an antenna configuration determination scheme according to the embodiment. In a radio communication system to which the antenna configuration determination scheme is applied, a radio base station has an array antenna with multiple antenna elements arranged. The radio base station provides the optimum antenna port configuration in accordance with the radio environment, the rank (the number of transmission layers or symbol streams), the number of users to be spatially multiplexed, etc. A single antenna element may be used as an antenna port, or two or more antenna elements may be arranged in a group to form an antenna port.

In the description below, the radio communication system is, for example, a long term evolution (LTE) system, in which a base station is named an evolved node B (abbreviated as "eNB") and a mobile device is named user equipment (abbreviated as "UE").

First, the eNB transmits a reference signal at a predetermined time interval from each antenna port and for each unit frequency (S101). A unit frequency is, for example, a certain range of frequency formed by one or more successive subcarriers. The predetermined time interval may vary according to the type of the reference signal. The reference signal includes, but is not limited to, a channel state information reference signal (CSI-RS). In the example described below, a CSI-RS is transmitted as the reference signal.

In one embodiment, an antenna port configuration is allocated corresponding to a CSI-RS subframe offset, and an CSI-RS is transmitted from each of the antenna ports of that corresponding antenna port configuration.

Figure 2:
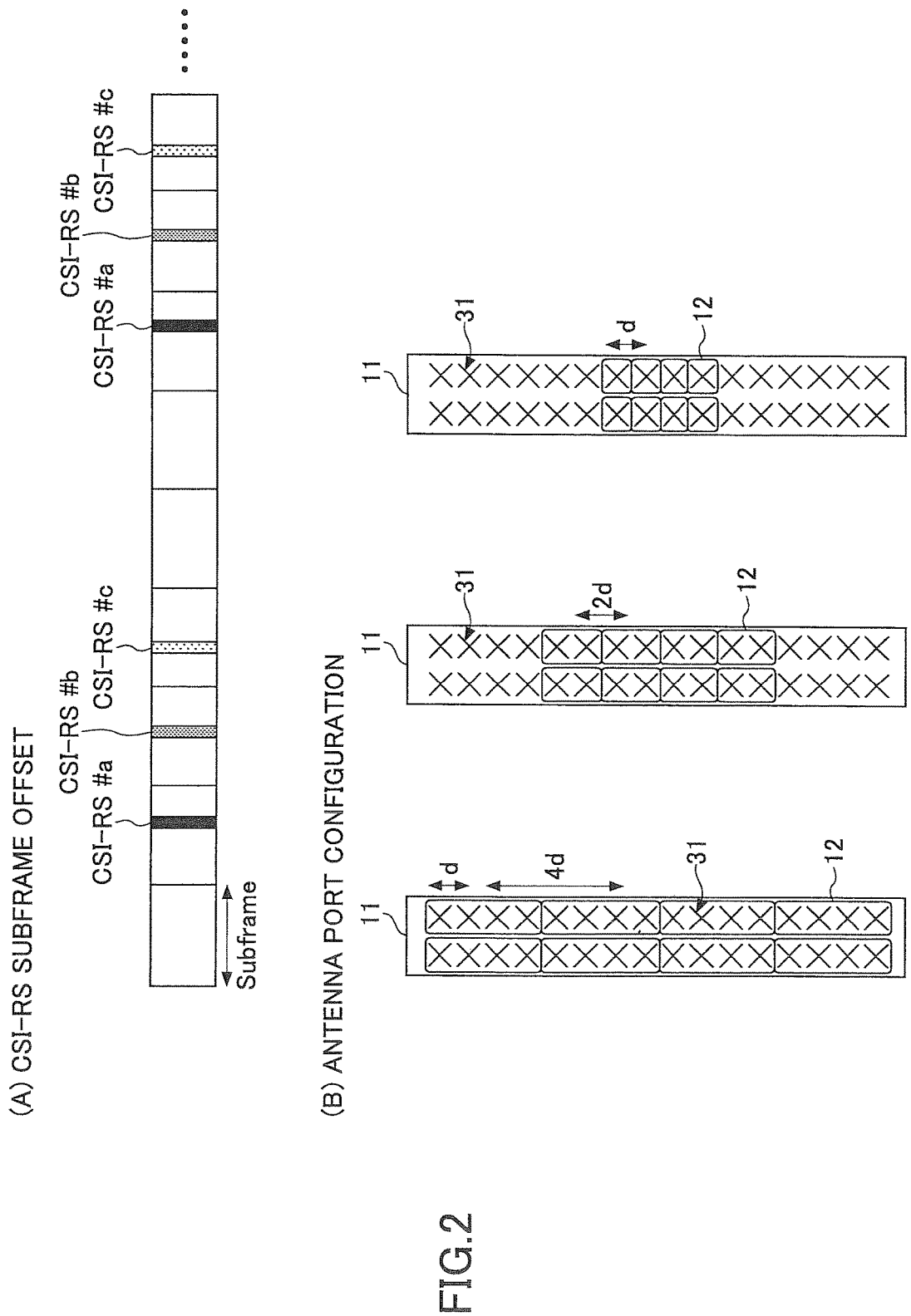
FIG. 2 illustrates reference signal allocation patterns corresponding to the respective antenna port configurations.

FIG. 2 illustrates examples of CSI-RS subframe offset corresponding to the respective antenna port configurations. Part (A) of FIG. 2 is a schematic diagram of OFDM symbols in which CSI-RSs are multiplexed to prescribed subframes in different subframe offset patterns. Part (B) of FIG. 2 illustrates antenna port configurations corresponding to the respective CSI-RS subframe offset patterns of part (A).

A CSI-RS subframe offset is an offset given to the transmission start position of a CSI-RS in a subframe allocated for transmission of that CSI-RS. In the example of FIG. 2, the CSI-RS transmission duty cycle is 5 subframes (i.e., 5 ms). The allocation pattern #a of CSI-RS to be transmitted under the antenna port configuration #a has a first subframe offset value. The allocation pattern #b of CSI-RS to be transmitted under the antenna port configuration #b has a second subframe offset value. The allocation pattern #c of CSI-RS to be transmitted under the antenna port configuration #c has a third subframe offset value. The CSI-RS transmission cycle and the subframe offset index indicating the CSI-RS allocation pattern may be informed from the eNB to UE over physical downlink control channel (PDCCH).

Figure 3:
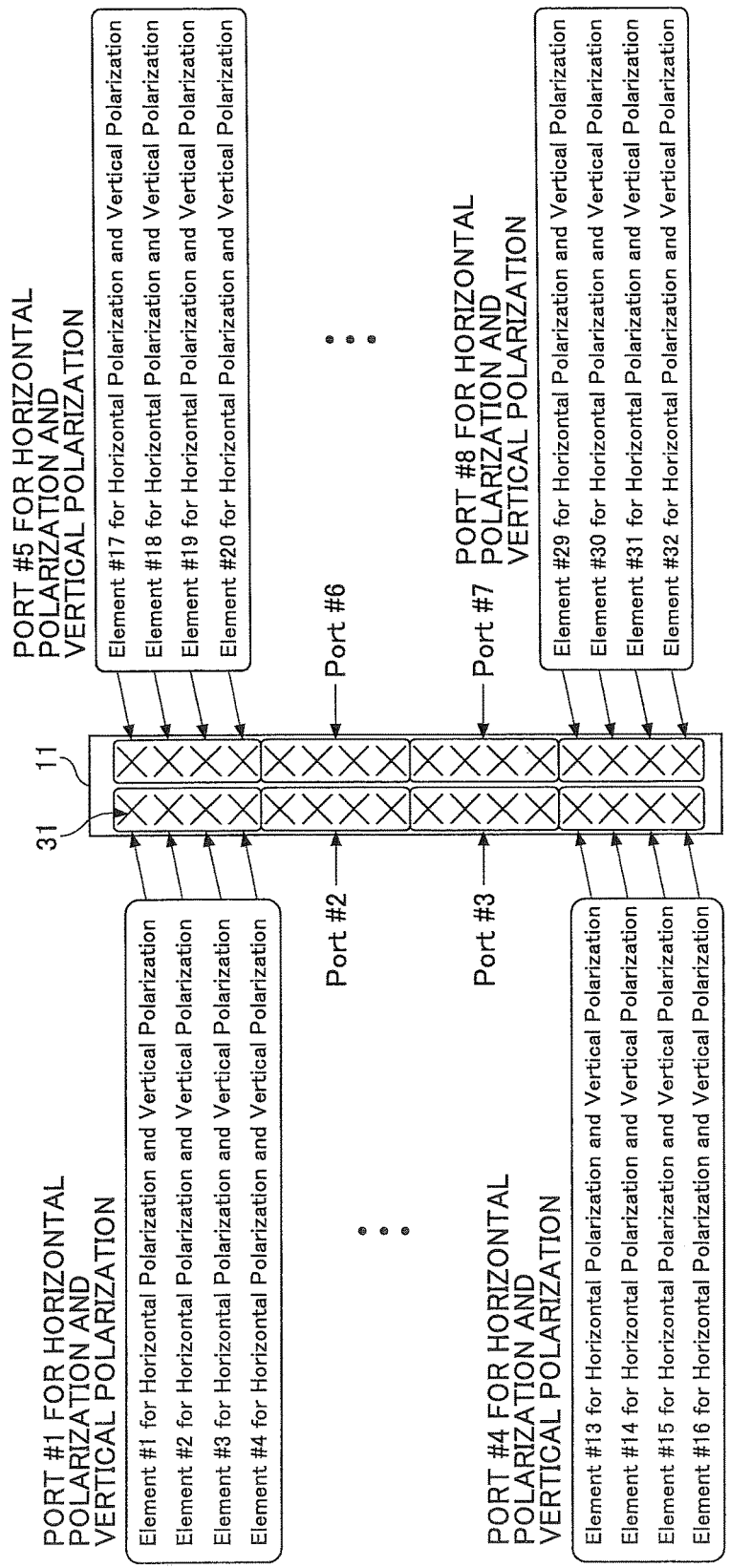
FIG. 3 illustrates an example of antenna port configuration.

FIG. 3 illustrates the antenna port configuration #a which corresponds to the CSI-RS allocation pattern #a with the first subframe offset value. An array antenna 11 furnished to the eNB has vertically arranged 16 physical antenna elements and horizontally arranged 2 physical antenna elements, the total of 32 physical antenna elements 31. Each of the antenna elements 31 is capable of treating horizontally polarized waves and vertically polarized waves. Accordingly, the array antenna 11 is functionally a 64-element antenna array (16×2×2=64).

In the antenna port configuration #a, four physical antenna elements, each with two polarized antenna functions (4×2 elements), form an antenna port, and the total of eight antenna ports are created. The antenna port #1 located at the top left of the array antenna 11 is formed of the physical antenna elements #1 to #4, each antenna element treating horizontally polarized waves and vertically polarized waves. Similarly, the antenna port #5 located at the top right of the array antenna 11 is formed of the physical antenna elements #17 to #20, each antenna element treating horizontally polarized waves and vertically polarized waves. The other antenna ports, including the antenna port #4 located at the bottom left and the antenna port #8 located at the bottom right, are also formed of groups of 4 physical antenna elements, each antenna element dealing with two orthogonal polarizations.

Referring back to FIG. 2, part (B), it is assumed that the space between the adjacent physical antenna elements is "d". In the antenna port configuration #a, the space between the vertically adjacent antenna ports is 4×d, and the space between the horizontally adjacent antenna ports is d. The space "d" between the adjacent antenna elements is, for example, half wavelength (λ/2) of the transmission wave.

When the angle between horizontally separated users is large, then the angle of arrival of the radio wave is large. In this case, the correlation between antenna ports is low even if the space between the horizontally adjacent antenna ports is narrow, and the user signals can be correctly separated. When two users are not sufficiently separated from each other in the vertical direction (in the elevation or depression angle seen from the eNB or in the radial direction of the cell), the correlation between antenna ports can be reduced by spacing vertically arranged antenna ports at several times of wavelength or more.

Figure 4:
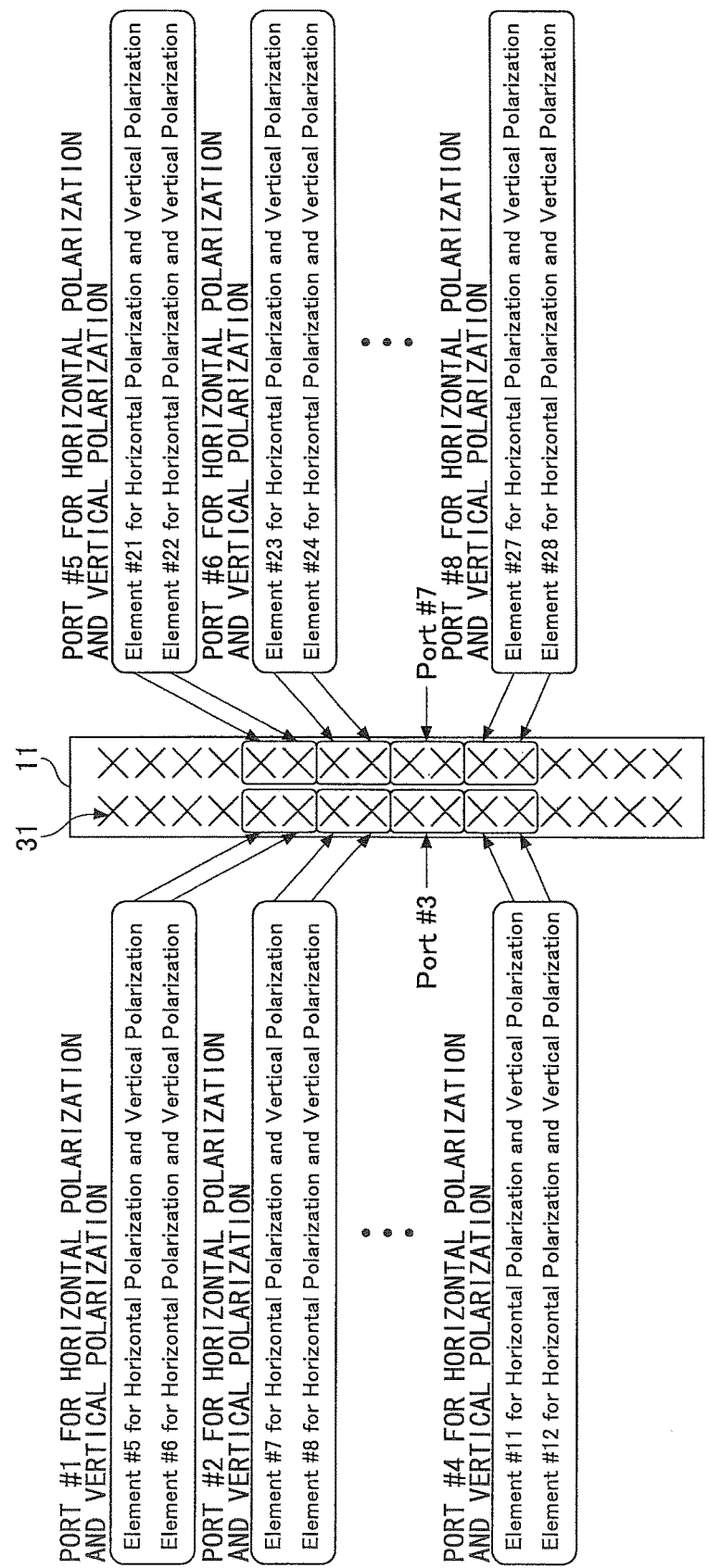
FIG. 4 illustrates another example of antenna port configuration.

FIG. 4 illustrates the antenna port configuration #b which corresponds to the CSI-RS allocation pattern #b with the second subframe offset value. The antenna port configuration #b uses antenna elements positioned in the central area of the array antenna 11. Two physical antenna elements 31 adjacent in the vertical direction, each antenna element functioning as a horizontally polarized antenna and a vertical polarized antenna, form an antenna port. Two vertically adjacent physical antennal elements multiplied by two orthogonal polarizations (2×2) form an antenna port and the total of eight antenna ports are created. The space between the vertically adjacent antenna ports is 2×d, and the space between the horizontally adjacent antenna ports is d.

In the example of FIG. 4, the antenna port configuration #b is implemented by horizontally polarized antennas and vertically polarized antennas of physical antenna elements #5 through #12 and horizontally polarized antennas and vertically polarized antennas of physical antenna elements #21 through #28. The rest of the physical antenna elements 31 may be left unused, or they may be used as other branches.

When users are separated in the vertical (or elevation) direction seen from the eNB to a certain extent, the user signals can be separated even if the space between the vertically adjacent antenna ports is smaller than the configuration of FIG. 3.

Figure 5:
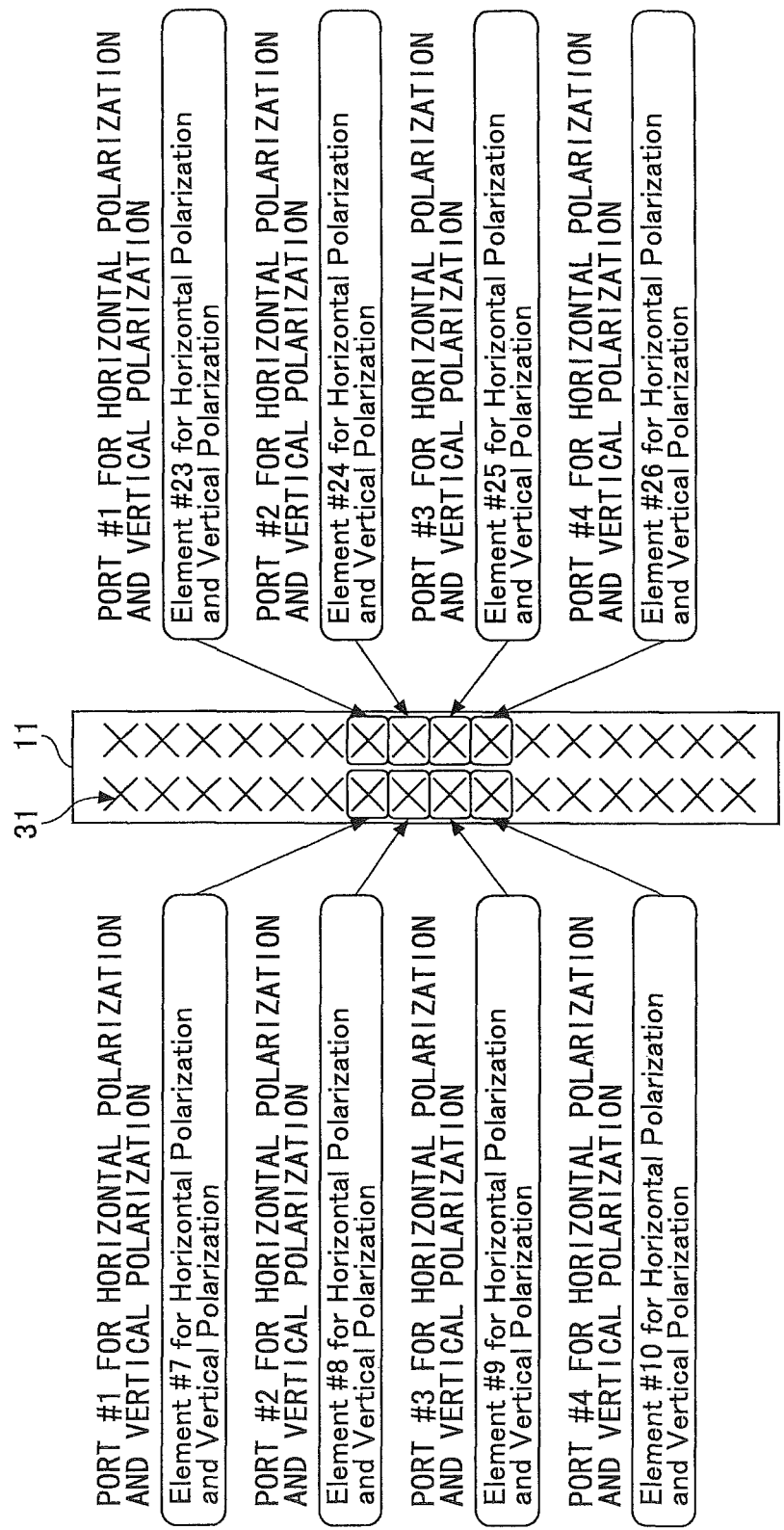
FIG. 5 illustrates still another example of antenna port configuration.

FIG. 5 illustrates the antenna port configuration #c which corresponds to the CSI-RS allocation pattern #c with the third subframe offset value. The antenna port configuration #c uses antenna elements positioned in the central area of the array antenna 11. One physical antenna element 31 serving as a horizontally polarized antenna and a vertically polarized antenna (1×2) forms an antenna port, and the total of eight antenna ports are created. The space between adjacent antenna ports is d in both horizontal and vertical directions. The antenna port configuration #c is implemented by the physical antenna elements #7 through #10 and antenna elements #23 through #26. The rest of the physical antenna elements 31 may be left unused, or they may be used as other branches.

In this manner, the eNB provides multiple antenna port configurations, and transmits a CSI-RS using one of the antenna port configurations at the corresponding subframe offset pattern.

Returning to FIG. 1, a UE receives the CSI-RS from the eNB at every CSI-RS subframe offset. The UE calculates a channel quality indicator (CQI) indicating the downlink channel receiving quality and a rank indicator (RI) of the channel matrix based upon the received CSI-RS, and generates a channel state indicator (CSI) that contains the optimum antenna port configuration index (S102).

When the UE received the CSI-RS from the eNB at a sufficient level of signal to interference rate (SIR) and a low bit error rate (BER), the correlation between antenna ports is low. The UE may select the antenna port configuration corresponding to the CSI-RS received at that timing. The UE may include the index of the selected antenna port configuration when creating the CSI feedback.

The UE may also determine the optimum precoding matrix corresponding to the selected antenna port configuration and the rank. A precoding matrix indicator (PMI) representing the determined precoding matrix may be included in the CSI. Alternatively, the UE may estimate the channel from the received CSI-RS and uses the channel estimation value itself as the feed information to the eNB.

Then, the UE reports the created CSI or the channel estimation value to the uNB over the uplink control channel (S103).

The eNB determines antenna elements that form the antenna port configuration, the number of streams multiplexed over the MIMO channel, and precoding weights based upon the CSI received from the UE (S104). Through this, the optimum correlation is determined between antenna ports.

Then, the eNB transmits downlink signals according to the determined antenna port configuration, the number of streams multiplexed on MIMO channel, and the precoding weights (S105). To implement the determined antenna port configuration, the eNB performs mapping of antenna ports to the respective antenna elements for each resource. Resources include, but are not limited to a cell-specific reference signal (CRS), a demodulation reference signal (DMRS), the CSI-RS, a control signal, a physical downlink shared channel (PDSCH) for UE1, a PDSCH for UE2, a sounding reference signal (SRS), and a physical broadcast channel (PBCH). A CSI-RS-added transmission signal $x_i$ is multiplied by an $N_A \times N_E$ complex matrix $S_i$ designated for each resource ($y_i = S_i \times x_i$), where $N_A$ denotes the number of antenna ports, $N_E$ denotes the number of antenna elements, and subscript "i" denotes the index number of the subcarrier.

Thus, the eNB transmits a CSI-RS from each antenna port at different CSI-RS subframe offset patterns and receives feedback information from the UE. The eNB can determine the optimum antenna configuration and control the antenna correlation, while preventing the amount of calculation from increasing.

Figure 6:
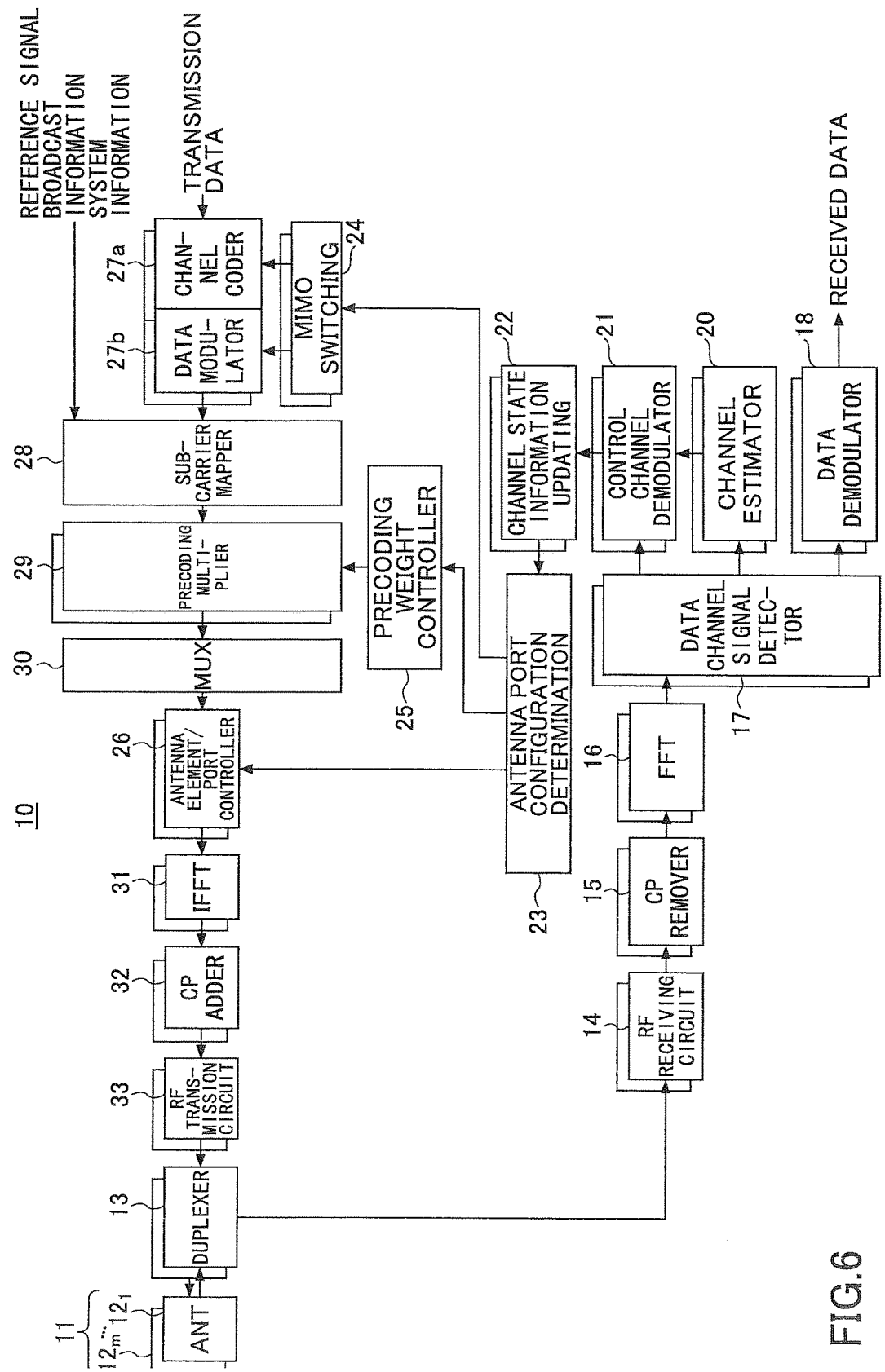
FIG. 6 is a schematic block diagram of a base station apparatus according to the embodiment.

FIG. 6 is a schematic block diagram of an eNB 10 according to the embodiment. Transmission data for each user undergo channel coding at a channel coder 27a and data modulation at a data modulator 27b. The channel coding rate and the modulation scheme for respective user data are determined by a MIMO switching block 24 based upon the antenna port configuration and the number of multiplexed MIMO streams determined by an antenna port configuration determination block 23.

The channel-coded and data-modulated transmission data item is input to a subcarrier mapper 28, together with a reference signal, a broadcast signal, system information, etc., and mapped to subcarriers.

The mapped transmission data item is multiplied by a precoding weight vector at a precoding multiplier 29 and weighted (i.e., the amplitude and/or the phase are adjusted) for each antenna port. Application of precoding weights to the transmission data item is controlled by a precoding weight controller 25 based upon the precoding weights determined by the antenna port configuration determination block 23.

The weighted transmission signals for the respective users are multiplexed at a multiplexer (MUX) 30, and transmission signals for antenna parts $12_1$ to $12_m$ are generated.

An antenna element/port controller 26 controls grouping of the antenna elements of the array antenna 11 according to the antenna port configuration determined by the antenna port configuration determination block 23 such that the transmission signal is transmitted at the optimum antenna port configuration.

The transmission signal is subjected to inverse fast Fourier transform at an IFFT block 31, adding of a cyclic prefix at a cyclic prefix (CP) adder 32 and frequency conversion at a radio frequency (RF) transmission circuit 33. Then the transmission signal is supplied from a duplexer 13 to the associated antenna parts (antenna elements) 12 and transmitted to each UE over a downlink channel.

Uplink signals from the respective UEs are received at the associated antenna parts 12 of the array antenna 11, supplied via the duplexer 13 to the corresponding RF receiving circuits 14. After frequency conversion to the baseband frequency at the RF receiving circuits 14, removal of cyclic prefix at CP removers 15, and fast Fourier transform at FFT blocks 16, the received signal is separated into respective user signals at data channel signal detector 17. A data channel signal of each user signal is demodulated at a data modulator 18, and decoded at a decoder (not illustrated) and the received data area acquired.

A channel estimator 20 estimates a channel using a reference signal (such as a sounding reference signal SRS) of each user detected at the data channel signal detector 17. A control channel demodulator 21 demodulates a control channel using a channel estimate value acquired by the channel estimator 20. A CSI updating block 22 extracts the CSI from the control channel of this user and updates the CSI for this user. The updated CSI is supplied to the antenna port configuration determination block 23.

The updated CSI may include antenna configuration information determined by the UE, or channel estimate value itself calculated by the UE.

The antenna port configuration determination block 23 determines grouping of antenna elements to configure the antenna port configuration, as well as the number of users to be multiplexed and precoding weights. The number of users to be multiplexed is supplied, together with the channel quality information, to the MIMO switching block 24. The precoding weights are supplied to the precoding weight controller 25. The antenna port configuration is supplied to the antenna element/port controller 26.

Owing to the antenna port configuration determination block 23 and the antenna element/port controller 26, an appropriate antenna port configuration is set up responsive to the changing radio environment, and user data can be transmitted appropriately even if an array antenna 11 has a large number of antenna elements.

Figure 7:
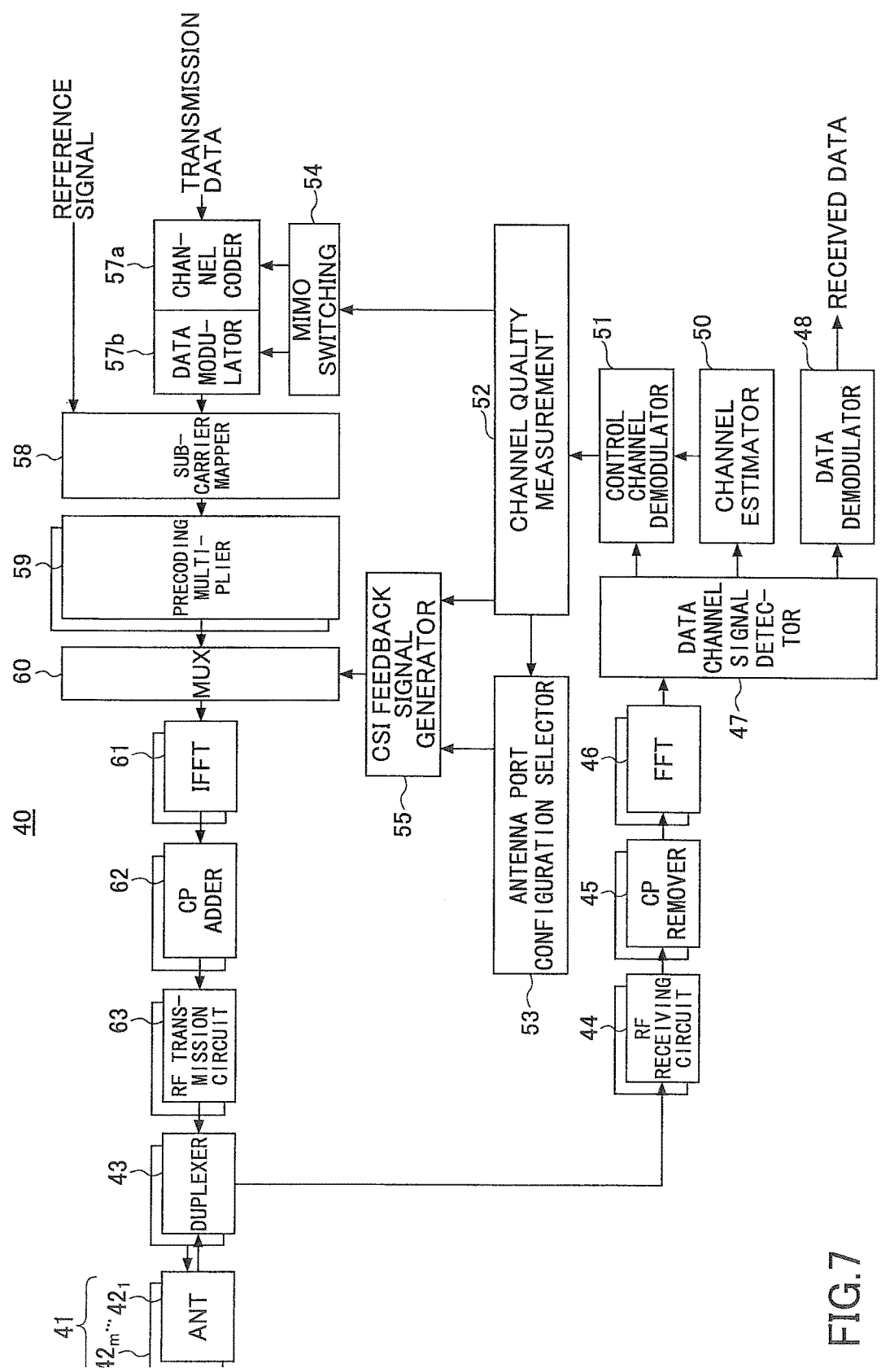
FIG. 7 is a schematic block diagram of a mobile device according to the embodiment.

FIG. 7 is a schematic block diagram of a mobile device 40. Signals transmitted from the eNB 10 are received at antenna parts $42_1$ through $42_m$ of the antenna 41 of the mobile device 40. The received signal is input via a duplexer 43 to an associated RF receiving circuit 44 and converted into a baseband signal. A cyclic prefix (CP) is removed at a CP remover 45, fast Fourier transform is performed at an FFT 46, and a signal addressed to the mobile device 40 is detected from the received signal at a data channel signal detector 47. Among the detected signals, a data channel signal is demodulated at a data demodulator 48, and decoded in the subsequent processing unit to recover the received data.

The CSI-RS received at each CSI-RS subframe offset is input to a channel estimator 50, at which channel estimation is performed for every CSI-RS subframe offset. A control channel demodulator 51 demodulates a control signal for the mobile device 40 using the respective channel estimate values. A channel quality measurement block 52 measures a downlink channel receiving quality based upon the demodulated control signal.

An antenna port configuration selector 53 determines an optimum antenna port configuration based upon the measurement result of the downlink channel quality. The antenna port configuration selector 53 also calculates a rank of the channel matrix and selects a precoding matrix.

A CSI feedback signal generator 55 generates a CSI that includes a channel quality indicator (CQI), an antenna port configuration, a precoding matrix indicator (PMI), and a rank indicator (RI).

Transmission data created at a higher layer of the mobile device 40 undergo channel coding at a channel code 57a and modulation at a data modulator 57b. By a subcarrier mapper 58, the channel-coded and modulated transmission data are mapped, together with a reference signal, to subcarriers allocated by the eNB 10.

The mapped transmission data are multiplied by precoding weights at a precoding multiplier 59 and weighted for each of the antenna ports. The precoding weights may be supplied from the eNB 10 over the control channel and extracted from the demodulated control signal.

The transmission data and a CSI feedback signal are combined at a multiplexer (MUX) 60, and transmission signal items for the respective antenna parts $42_1$ through $41_m$ are generated. For each of the antenna parts $42_1$ through $41_m$, the transmission signal item undergoes inverse fast Fourier transform at an associated IFFT block 61, adding of a cyclic prefix (CP) at a CP adder 62 and conversion to a radio frequency at an RF transmission circuit 63. The transmission signal item is transmitted via a duplexer 43 from the associated antenna part 42.

Figure 8:
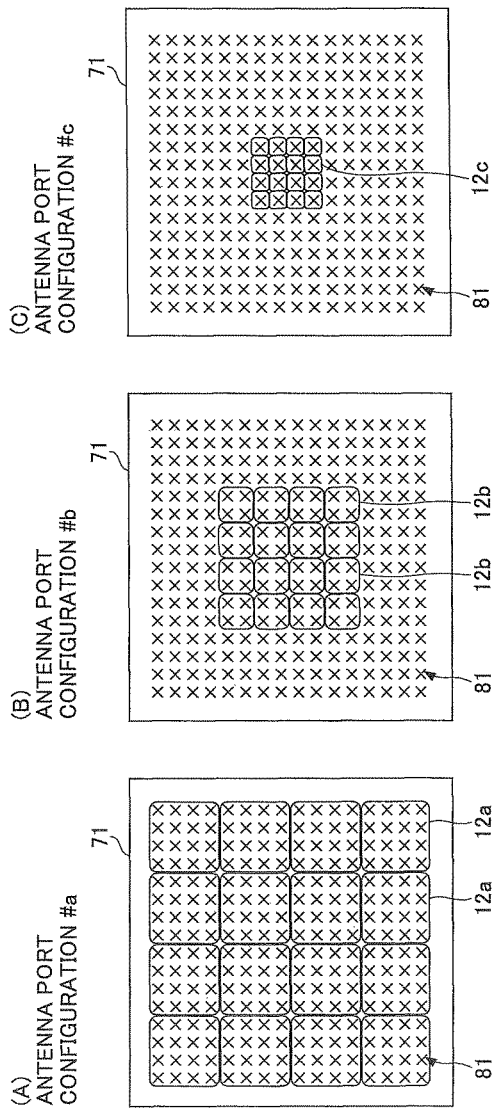
FIG. 8 illustrates yet other examples of antenna port configuration.

FIG. 8 illustrates other examples of antenna port configurations. An array antenna 71 has 16×16 physical antenna elements 81, sixteen arranged in the horizontal direction and sixteen arranged in the vertical direction. Each of the physical antenna elements 81 is capable of treating horizontally polarized waves and vertically polarized waves. Part (A) of FIG. 8 illustrates antenna port configuration #a, in which sixteen antenna ports 12a are formed. Each antenna port 12a includes 4×4 physical antenna elements multiplied by two polarizations (4×4×2 elements). Assuming that the distance between the adjacent physical antenna elements 81 is "d", the spacing between antenna ports is 4×d in both the horizontal and vertical directions. The CSI-RS is transmitted from each antenna port 12a at a subframe offset #a. This subframe offset #a may be the same as or different from the subframe offset #a illustrated in part (A) of FIG. 2.

Part (B) of FIG. 8 illustrates antenna port configuration #b, in which sixteen antenna ports 12b are formed. Each antenna port 12b includes 2×2 physical antenna elements multiplied by two polarizations (2×2×2 elements). The spacing between antenna ports is 2×d in both the horizontal and vertical directions. The CSI-RS is transmitted from each antenna port 12b at a subframe offset #b. This subframe offset #b may be the same as or different from the subframe offset #b illustrated in part (B) of FIG. 2. The reset of the physical antennas 81 may not be used, or they may be used to form other branches.

Part (C) of FIG. 8 illustrates antenna port configuration #c, in which sixteen antenna ports 12c are formed. Each antenna port 12c includes a single physical antenna element multiplied by two polarizations (1×2 elements). The spacing between antenna ports is d in both the horizontal and vertical directions. The CSI-RS is transmitted from each antenna port 12c at a subframe offset #c. This subframe offset #c may be the same as or different from the subframe offset #c illustrated in part (C) of FIG. 2.

With the configurations of FIG. 8, a reference signal such as a CSI-RS is transmitted at a subframe offset that corresponds to the associated antenna port configuration. At UE, the CSI-RS is received at each subframe offset, and an appropriate antenna port configuration can be selected anytime.

Figure 9:
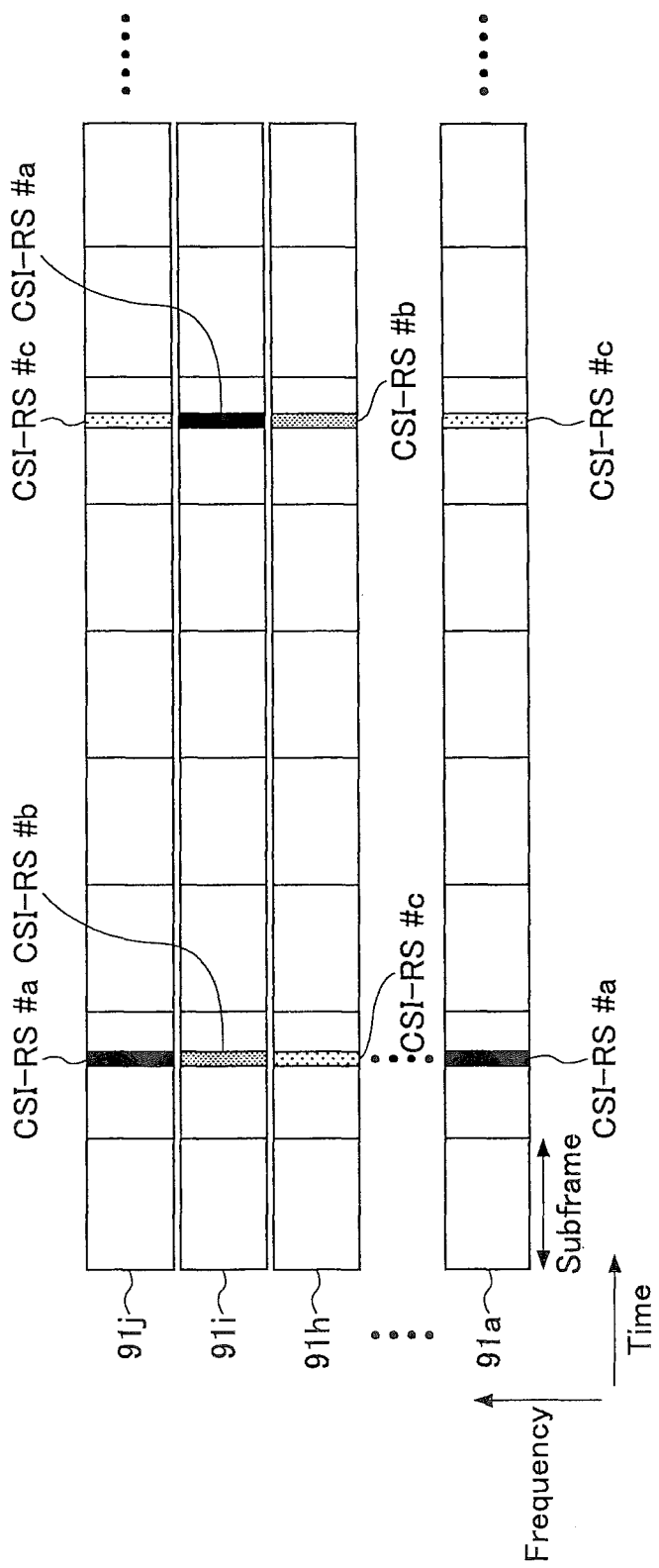
FIG. 9 illustrate another example of reference signal allocation patterns in accordance with the antenna port configurations.

FIG. 9 illustrates other examples of reference signal allocation patterns. In the examples of FIG. 2, antenna port configurations are allocated for different CSI-RS subframe offsets; however, different antenna port configurations may be allocated for different frequencies used for CSI-RS transmission. In the latter case, the UE calculates the downlink channel receive quality and the rank of the channel matrix from the CSI-RS received for the respective frequency indexes, and selects the optimum frequency index, namely, the optimum antenna port configuration.

The invention has been described above based upon specific examples; however, the invention is not limited to these examples. In the above-described example, CSI-RS is used advantageously to determine the antenna port configuration because CSI-RS is transmitted at a constant subframe duty cycle. However, other reference signals (including DM-RS or CRS) may be used. The number or types of antenna port configurations are not limited to the above-described examples. The optimum inter-port correlation may be selected from a greater number of antenna port configurations. The UE may return a channel estimate value itself. The base station can also determine antenna elements that form the respective antenna ports from the channel estimate value. The antenna port is not necessarily formed of a group of antenna elements. Depending on the communication environment, an antenna port may be set up from a single antenna element.

This patent application is based upon and claims the benefit of the priority of Japanese Patent Application No. 2013-163654 filed Aug. 6, 2013, which is incorporated herein by references in its entirety.

What is claimed is:

1. A radio communication system comprising:
   a radio base station apparatus,
   wherein the radio base station apparatus has a plurality of antenna port configurations formed of one or more antenna ports including single antenna elements or groups of antenna elements each grouped in an array arranged in both a horizontal direction and a vertical direction, and
   wherein the radio base station apparatus is configured to transmit a reference signal from each antenna port formed by one or more antenna elements each transmitting a polarized wave in patterns corresponding to said plurality of antenna port configurations; and
   a mobile device,
   wherein the mobile device is configured to receive the reference signal for each of the patterns and transmit feedback information to the radio base station apparatus,
   wherein the radio base station apparatus is configured to determine an antenna element that forms said each antenna port and a number of symbol streams multiplexed over a Multiple Input Multiple Output (MIMO) channel based upon the feedback information, and
   wherein an antenna port of a first antenna port configuration comprises a single antenna element, an antenna port of a second antenna port configuration comprises 2×2 antenna elements, and an antenna port of a third antenna port configuration comprises 4×4 antenna elements.

2. The radio communication system according to claim 1, wherein the radio base station apparatus is configured to transmit the reference signal in different subframe offset patterns corresponding to said plurality of antenna port configurations.

3. The radio communication system according to claim 2, further comprising:
   a mobile device,
   wherein the mobile device is configured to receive the reference signal in the different subframe offset patterns and create feedback information containing information about an optimum antenna port configuration.

4. The radio communication system according to claim 1, wherein the radio base station apparatus is configured to transmit the reference signals at different frequencies corresponding to said plurality of antenna port configurations.

5. The radio communication system according to claim 4, further comprising:
a mobile device,
wherein the mobile device is configured to receive the reference signals at the different frequencies and create feedback information containing information about an optimum antenna port configuration.

6. An antenna configuration determination method, comprising:
at a base station apparatus, transmitting a reference signal from each antenna port formed by one or more antenna elements each transmitting a polarized wave in multiple patterns corresponding to a plurality of antenna port configurations formed of one or more antenna ports including single antenna elements or groups of antenna elements each grouped in an array arranged in both a horizontal direction and a vertical direction; and
determining an antenna element that forms said each antenna port and a number of symbol streams multiplexed over a Multiple Input Multiple Output (MIMO) channel based upon feedback information supplied from a mobile device that has received the reference signal in said multiple patterns,
wherein an antenna port of a first antenna port configuration comprises a single antenna element, an antenna port of a second antenna port configuration comprises 2×2 antenna elements, and an antenna port of a third antenna port configuration comprises 4×4 antenna elements.

7. The antenna port configuration determination method according to claim 6,
wherein the reference signal is transmitted in different subframe offset patterns corresponding to said plurality of antenna port configurations.

8. The antenna port configuration determination method according to claim 6,
wherein the reference signal is transmitted at different frequencies corresponding to one of said multiple antenna port configurations.

\* \* \* \* \*